US006899578B2

(12) United States Patent
Nagafusa

(10) Patent No.: US 6,899,578 B2
(45) **Date of Patent: *May 31, 2005**

(54) ENGINE CONTROL ARRANGEMENT FOR WATERCRAFT

(75) Inventor: Makoto Nagafusa, Hamamatsu (JP)

(73) Assignee: Yamaha Marine Kabushiki Kaisha, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/441,920

(22) Filed: May 20, 2003

(65) Prior Publication Data

US 2004/0023568 A1 Feb. 5, 2004

Related U.S. Application Data

(63) Continuation of application No. 09/900,475, filed on Jul. 6, 2001, now Pat. No. 6,565,397.

(51) Int. Cl.[7] .................................... B60K 41/00

(52) U.S. Cl. .................................... 440/87; 440/1

(58) Field of Search .......................... 440/1, 2, 84–87

(56) References Cited

U.S. PATENT DOCUMENTS 4,100,877 A 7/1978 Scott et al.
4,759,731 A 7/1988 Uchida et al.
4,940,433 A 7/1990 Raber
5,433,635 A 7/1995 Kobayashi
5,615,645 A 4/1997 Kanno
5,690,063 A 11/1997 Motoyama et al.
5,699,749 A 12/1997 Yamada et al.
5,833,501 A 11/1998 Jones
5,885,120 A 3/1999 Yamazaki et al.
5,937,825 A 8/1999 Motose
6,213,041 B1 4/2001 Kojima et al.
6,213,820 B1 * 4/2001 Kanno ............................ 440/1
6,336,833 B1 * 1/2002 Rheault et al. ................ 440/1
6,565,397 B2 * 5/2003 Nagafusa ...................... 440/87

* cited by examiner

*Primary Examiner*—Ed Swinehart
(74) *Attorney, Agent, or Firm*—Knobbe, Martens, Olson & Bear, LLP

(57) ABSTRACT

An engine control system and a method control the engine speed of a watercraft that is propelled by a stream of water generated by propulsion unit driven by an engine. The system and method detect whether the propulsion unit is generating the stream of water. The system and method limit the maximum engine speed to a first speed when the propulsion unit is generating the stream of water and limit the maximum engine speed to a second speed, lower than the first speed, when the propulsion unit is not generating the stream of water.

15 Claims, 4 Drawing Sheets

ENGINE CONTROL ARRANGEMENT FOR WATERCRAFT

PRIORITY INFORMATION

This application is a continuation of U.S. patent application Ser. No. 09/900,475, filed Jul. 6, 2001 now U.S. Pat. No. 6,565,397, which is based on Japanese Patent Application No. 2000-169273, filed Jun. 6, 2000, the entire contents of which is hereby expressly incorporated by reference.

BACKGROUND OF THE INVENTION

1. Field of the Invention

The present application relates to an engine control arrangement for controlling a watercraft, and more particularly relates to an engine management system that controls engine speed in order to reduce noise.

2. Description of the Related Art

Watercraft, including personal watercraft and jet boats, are often powered by at least one internal combustion engine having an output shaft arranged to drive one or more water propulsion devices. Occasionally, engine revving is conducted out of the water in order to test the engine or to use exhaust pressure to drain salt water that has entered the engine during cruising.

Unfortunately, since there is no water resistance applied to the propulsion device when revving the engine out of the water, the engine speed may easily reach or exceed a maximum safe speed when the throttle is slightly applied, which causes extremely loud noise.

SUMMARY OF THE INVENTION

The present application is directed to an engine control arrangement of the type used to power a watercraft, which controls the engine speed and prevents the engine from revving too high when out of the water, thus preventing excessively loud noise.

One aspect of the preferred embodiments is an engine speed control system for a watercraft that is propelled by a stream of water generated by a propulsion unit driven by an engine. The engine control system comprises means for detecting whether the propulsion unit is generating a stream of water. The system also comprises a controller responsive to the means for detecting, the controller limiting the maximum engine speed to a first speed when the propulsion unit is generating the stream of water, the controller limiting the maximum engine speed to a second speed, lower than the first speed, when the propulsion unit is not generating the stream of water.

In one preferred embodiment of this first aspect, the means for detecting comprises a first sensor that senses ambient atmospheric pressure and a second sensor that senses a pressure responsive to the movement of the stream of water. The means for detecting compares the ambient atmospheric pressure and the pressure responsive to the movement of the stream of water to determine whether the stream of water is being generated by the propulsion unit.

In one particularly preferred embodiment, the propulsion unit includes an inlet that receives water, and the second sensor is positioned in the inlet such that the pressure sensed by the second sensor decreases with increasing water flow and increases with decreasing water flow.

In an alternative particularly preferred embodiment, the propulsion unit includes an outlet that conveys the stream of water generated by the propulsion unit, and the second sensor is positioned in the outlet such that the pressure sensed by the second sensor increases with increasing water flow and decreases with decreasing water flow.

In an alternative embodiment, the means for detecting comprises a sensor that responds to the speed of the watercraft to determine whether the stream of water is being generated by the propulsion unit.

In accordance with a particular aspect of the preferred embodiment, the controller reduces the engine speed to the second speed only after the controller determines that the propulsion unit is not generating the stream of water for a predetermined time duration. For example, the predetermined time duration is advantageously at least 5 seconds.

In one exemplary embodiment, the first speed is 7,000 revolutions per minute, and the second speed is 4,000 revolutions per minute.

A second aspect of the preferred embodiments is a method for reducing engine speed and thereby reducing engine noise of a watercraft propelled by a stream of water generated by a propulsion unit driven by an engine when the watercraft is out of the water. The method comprises sensing whether the watercraft is out of the water, controlling the engine speed to a first maximum speed when the watercraft is in the water, and controlling the engine speed to a second maximum speed when the watercraft is out of the water, the second maximum speed lower than the first maximum speed.

In one preferred embodiment of this second aspect, the sensing step comprises comparing a first pressure with a second pressure to determine whether water is flowing through the propulsion unit. In a particularly preferred embodiment, the first pressure is ambient atmospheric pressure, and the second pressure is determined by the flow of water through the propulsion unit.

In a first alternative of this particularly preferred embodiment. the second pressure is measured at an inlet to the propulsion unit, the second pressure decreasing with increasing flow of water and decreasing with increasing flow of water.

In a second alternative of this particularly preferred embodiment, the second pressure is measured at an outlet to the propulsion unit, the second pressure decreasing with decreasing flow of water and increasing with increasing flow of water.

In an alternative embodiment, the sensing step comprises sensing the speed of the watercraft to determine whether water is flowing through the propulsion unit.

In particular aspects of the method, the engine speed is controlled to the second speed only after the method determines that the propulsion unit is not generating the stream of water for a predetermined time duration. In an exemplary embodiment of the method, the predetermined time duration is at least 5 seconds.

In particular embodiments of the method, the first speed is 7,000 revolutions per minute, and the second speed is 4,000 revolutions per minute.

BRIEF DESCRIPTION OF THE DRAWINGS

These and other aspects of the preferred embodiment of the invention are described in detail below in connection with the accompanying drawings in which.

DETAILED DESCRIPTION OF THE PREFERRED EMBODIMENT

The preferred embodiment is an engine control arrangement for an engine of the type utilized to power a watercraft, including a personal watercraft or a jet boat.

Figure 1:
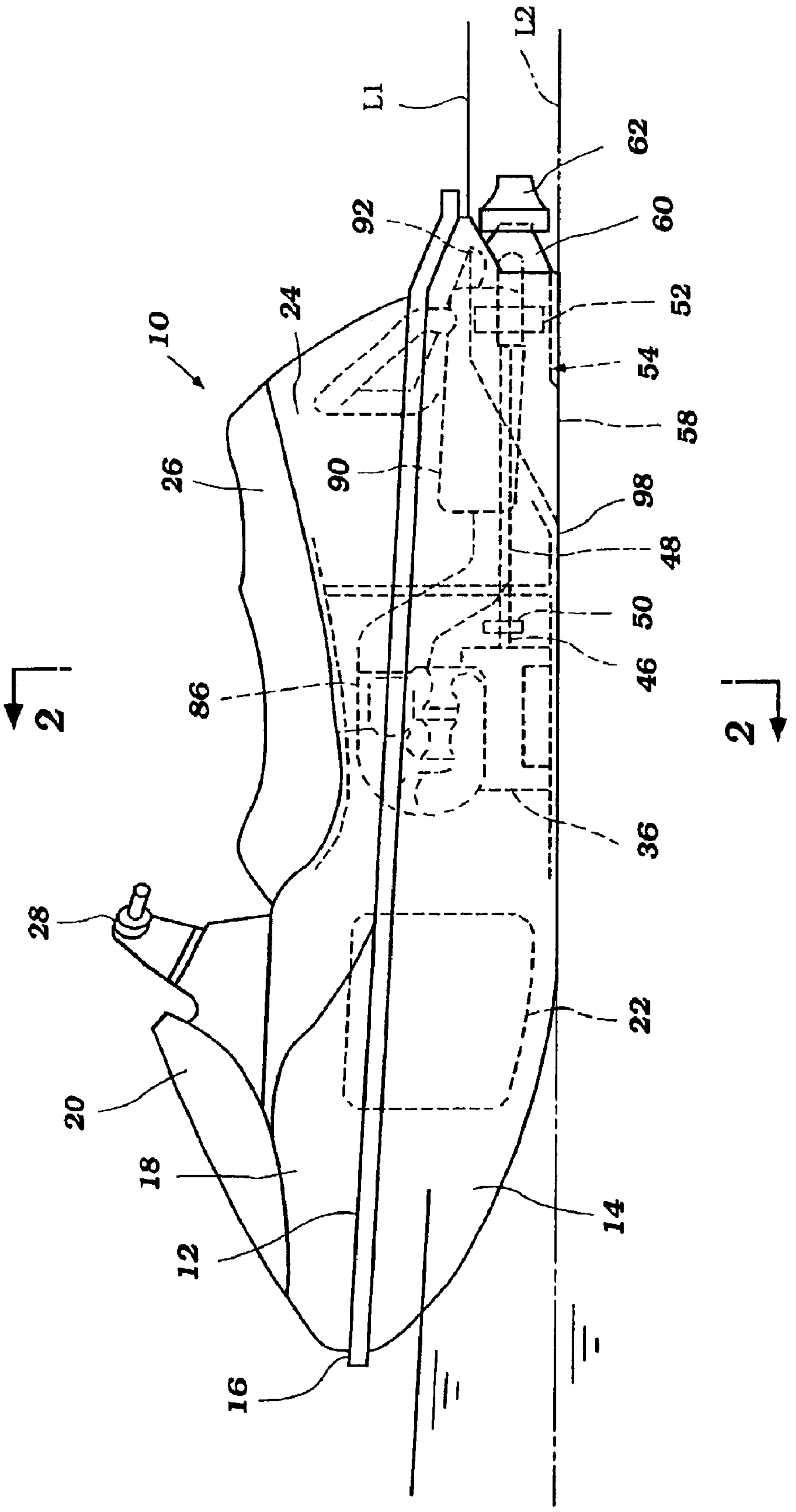
FIG. 1 is a side view of a personal watercraft of the type powered by an engine having an engine control arrangement in accordance with the present invention, the engine and other watercraft components positioned within the watercraft illustrated in phantom.

FIG. 1 illustrates a watercraft 10 comprising a top portion or deck 12 and a lower portion 14. A gunwale 16 defines the intersection of the deck 12 and the lower portion 14. A cover 18 is provided in the front upper side of the deck 12. A storage cover 20 is mounted on the forward side of the cover 18. A fuel tank 22 (shown in phantom) is located in the lower portion 14.

The rear portion of the deck 12 provides a seat base 24. A seat 26 is positioned on the seat base 24. A steering handle 28 is provided adjacent the seat 26 for use by a user in directing the watercraft 10.

Figure 2:
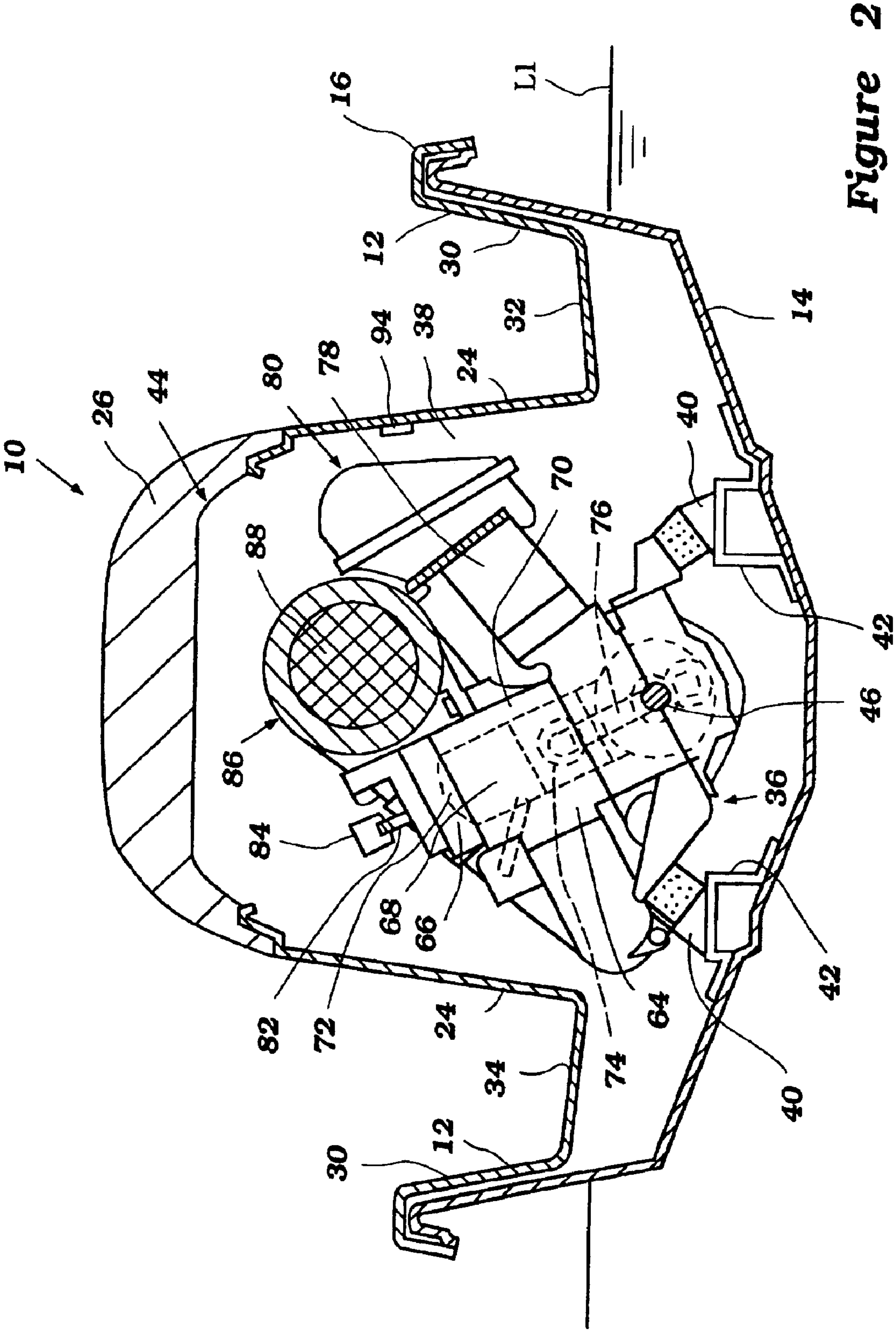
FIG. 2 is a cross-sectional end view of the watercraft taken along the line 2—2 of FIG. 1, illustrating the engine therein and a portion of the exhaust system with a catalyst in cross-section.

As illustrated in FIG. 2, a respective bulwark 30 extends upwardly along each side of the watercraft 10. A respective footstep area 32, 34 is defined between the seat base 24 and each bulwark 30.

As illustrated in FIGS. 1 and 2, the watercraft 10 includes an engine 36 positioned in an engine compartment 38. The engine 36 is preferably a two-cylinder, two-cycle engine. The engine 36 may have as few as one, or more than two cylinders, as will be appreciated by one skilled in the art.

As illustrated in FIG. 2, the engine 36 is connected to the lower portion 14 via several engine mounts 40. The mounts 40 are connected to upwardly extending supports 42, which are connected to the lower portion 14 of the watercraft 10. The engine 36 is preferably at least partially accessible through a maintenance opening 44 accessible by removing the seat 26.

The engine 36 has a crankshaft 46 (see FIG. 2) which is in driving relation with an impeller shaft 48 (see FIG. 3) through a coupling 50 (see FIG. 1). The impeller shaft 48 rotationally drives a means for propelling water (e.g., an impeller 52) in a propulsion unit 54, which unit extends out the stern portion of the watercraft 10.

The propulsion unit 54 includes a propulsion passage 56 having an intake port (i.e., a water inlet 58). The water inlet 58 extends through the lower portion 14 of the watercraft 10. The passage 56 also has an outlet 60 that has a discharge positioned within a nozzle 62. The nozzle 62 is mounted for movement up and down and to the left and right, whereby the direction of the propulsion force for the watercraft 10 may be varied.

The engine 36 includes a cylinder block 64 having a cylinder head 66 connected thereto and cooperating therewith to define a combustion chamber 68 defined by cylinder wall 70 within the block 64 and by a recessed area 72 in the cylinder head 66. A piston 74 is movably mounted in the combustion chamber 68, and is connected to a crankshaft 46 via a connecting rod 76, as is well known in the art. A second combustion chamber (not shown) is positioned in line with the first combustion chamber 68 and has similar construction. Preferably, the engine 36 is tilted so that the combustion chambers have a centerline C which is offset from a vertical axis V. As is well known in the art, this arrangement keeps the vertical profile of the engine small, such that the watercraft 10 has a low center of gravity.

The engine 36 includes means (e.g., an intake manifold 78) for providing an air and fuel mixture to each combustion chamber. The intake manifold 78 has a silencer 80 mounted on the input end. Preferably, air is drawn into the engine compartment 38 and then drawn into the silencer 80 and delivered to the combustion chambers via the intake manifold 78. As illustrated in FIG. 2, fuel is delivered to a fuel injector 82 through a fuel rail 84. It is contemplated that the fuel may be provided by indirect or direct fuel injection, as well as via carburation, as known in the art.

As shown in FIG. 2, a catalyst 88 is located in the center of an exhaust pipe 86. The exhaust pipe 86 wraps around the front of the engine 36 and extends to the rear of the watercraft 10 where it connects to a water lock 90. An exhaust outlet 92 is located below a water a level L1 when the watercraft is in the stationary position. The exhaust outlet 92 is located above a water level L2 when the watercraft is planing.

A suitable ignition system is provided for igniting the air and fuel mixture provided to each combustion chamber. Preferably, this system comprises a spark plug (not shown) corresponding to each combustion chamber. The spark plugs are preferably fired by a suitable ignition system.

It is contemplated that the ignition system incorporates preprogrammed ignition maps to control the ignition spark advance curve. In a similar way, both the indirect and direct fuel injection systems incorporate pre-programmed fuel delivery maps to control fuel injection timing issues. The ignition maps and the fuel delivery maps are software that are part of a control system.

Figure 3:
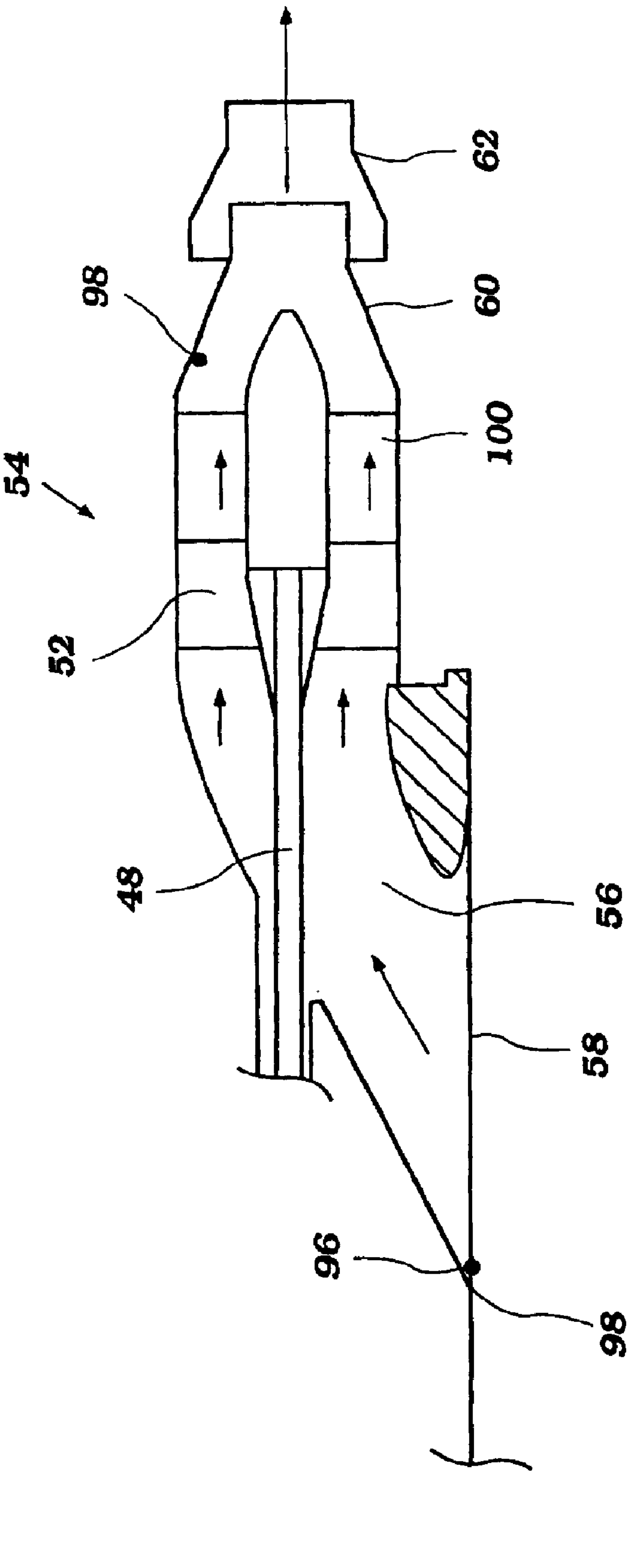
FIG. 3 is a cross sectional side view of the jet propulsion unit illustrating the pressure sensors therein.

As shown in FIG. 2, the control system includes an atmospheric pressure sensor 94, which can be mounted in the engine compartment 38 or mounted directly on the engine 36. As shown in FIG. 3, an inlet pressure sensor 96 is mounted at a ramp 98 at the forward side of the water inlet 58. As further shown in FIG. 3, the inlet pressure sensor 96 can be replaced by a nozzle pressure sensor 99 mounted on the outlet 60. The nozzle pressure sensor 99 detects nozzle pressure downstream of a set of stationary blades 100. Furthermore both of the sensors 96 and 99 may be replaced with a watercraft speed sensor.

Figure 4:
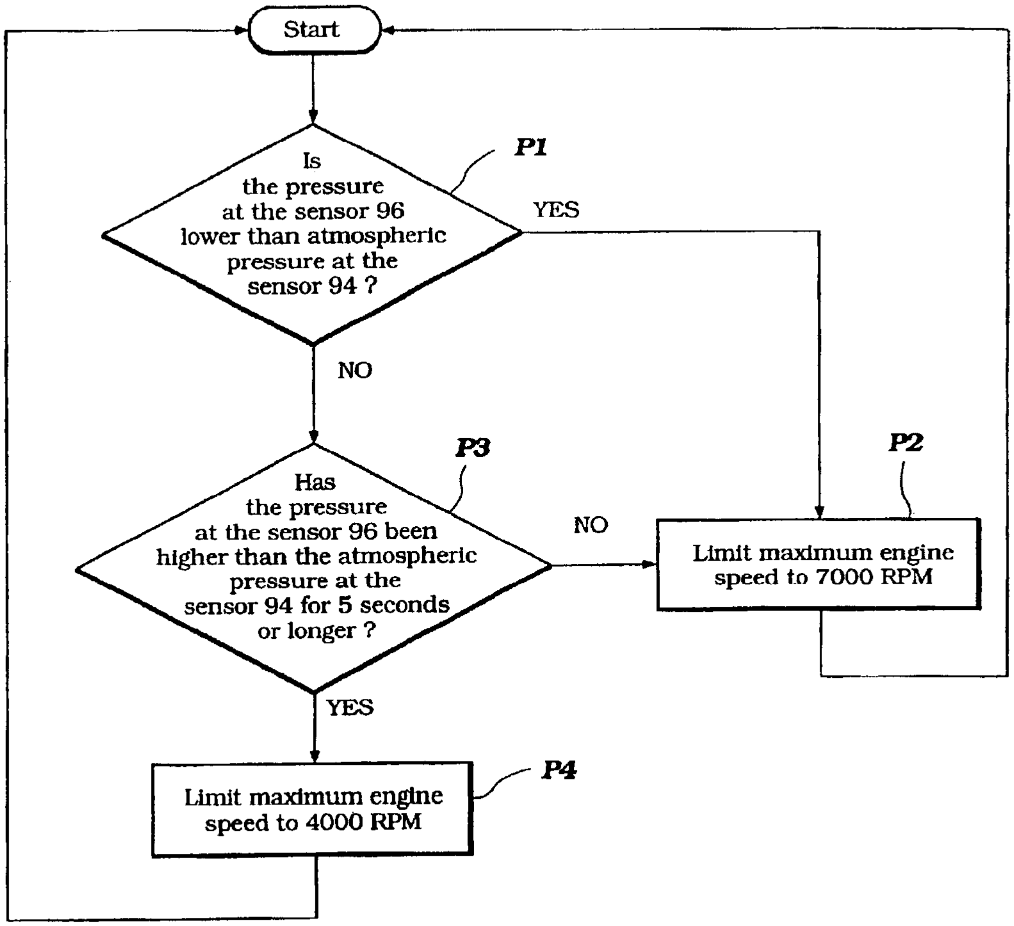
FIG. 4 is a block diagram showing a control routine constructed and operated in accordance with an embodiment of the invention.

The control system operates by a control routine as best seen in FIG. 4. The program starts and then moves to a step P1 to read the condition of the inlet pressure sensor 96 and determine if the inlet pressure is lower than the atmospheric pressure measured by the pressure sensor 94. If the inlet pressure is lower, meaning water is traveling into the water inlet 58, then the program moves to a step P2 to allow the maximum engine rpm to be 7000. The program returns to the start of the control routine and repeats the reading and decision process as long as the engine is running.

If however, at the step P1, the inlet pressure measured by the sensor 96 is greater than or equal to the atmospheric pressure measured by the sensor 94, the program moves to a step P3. In the step P3 the program determines whether the inlet pressure measured by the sensor 96 has been greater than or equal to the atmospheric pressure for more than five seconds. If the measured inlet pressure has been greater than or equal to the atmospheric pressure for longer than five seconds, then the program moves to a step P4 and limits the maximum engine rpm to 4000. The program returns to the start of the control routine and repeats the forgoing steps.

If, at the step P3, the measured inlet pressure has been greater than or equal to the atmospheric pressure for less than five seconds, then the program moves to the step P2 to allow the maximum engine rpm to be 7000. The program returns to the start of the control routine and repeats the forgoing steps. The five-second delay period allows sufficient time for the control system to permit for short durations of out-of-water operation, caused for example, by porpoising or jumping, which commonly occurs with watercraft operation. The maximum engine speed is not reduced unless the watercraft remains out of the water for more than five seconds.

If the pressure sensor 96 is replaced with the nozzle pressure sensor 99, the control sequence will determine in the step P1 whether the nozzle pressure is higher than the atmospheric pressure measured by the sensor 94. If the nozzle pressure is not higher than the atmospheric pressure, then in the step P3, the control sequence determines if the nozzle pressure was not higher than the atmospheric pressure for more than five seconds. Similarly, if a watercraft speed sensor is used instead of the pressure sensor 82, then in step P1, the control sequence determines whether or not the watercraft speed is greater than a predetermined speed. If the watercraft speed is not greater than a predetermined speed, then in the step P3, the control sequence determines if the watercraft speed was less than the predetermined speed for more than 5 seconds before limiting the maximum engine speed.

In the preferred embodiment, the operational state of the watercraft can be advantageously determined using the pressure sensor 96, the nozzle pressure sensor 99, or the speed sensor, as long as the control sequence can determine if the watercraft is on the water or how long it is out of the water.

The inlet pressure sensor 96 can be advantageously located in different areas of the water passage as long as it is located in the general vicinity of the water inlet 58.

If the control system regulates the engine speed using the ignition system, the firing of one or any of the cylinders may be completely or intermittently stopped, or the firing of all cylinders may be intermittently stopped.

Similarly, if the control system uses the fuel control to regulate engine speed, the fuel injection of one or any of the cylinders may be completely or intermittently stopped, or the fuel injection from all the cylinders may be intermittently stopped.

Thus, from the foregoing description, it should be readily apparent that the described embodiments very effectively control engine speed in order to reduce noise. Comparing the pressure measured in the water inlet to the atmospheric pressure in order to determine the operating condition of the watercraft accomplishes this.

Of course, the foregoing description is that of preferred embodiments of the invention, and various changes and modifications may be made without departing from the spirit and scope of the invention, as defined by the appended claims.

What is claimed is:

1. A personal watercraft comprising a hull, an internal combustion engine positioned in the bull, a fuel injection system, an ignition system, an engine control system, an engine speed sensor, a propulsion unit, at least two pressure sensors, a first pressure sensor configured to detect a water pressure, a second pressure sensor, the first pressure sensor and the second pressure sensor communicating with the engine control system, the engine control system configured to detect engine speed and control engine speed through at least one of the fuel injection system and the ignition system based on a comparison of the output of the first pressure sensor and the second pressure sensor.

2. The watercraft of claim 1, wherein the first pressure sensor is mounted on the bottom surface of the hull.

3. The watercraft of claim 1, wherein the first pressure sensor is mounted in the vicinity of an inlet port of the propulsion unit.

4. The watercraft of claim 1, wherein the first pressure sensor is mounted inside the propulsion unit.

5. The watercraft of claim 1, wherein the first pressure sensor is mounted in the vicinity of an outlet port of the propulsion unit.

6. The watercraft of claim 1, wherein the second pressure sensor is mounted on the watercraft above a watercraft waterline.

7. A method of controlling an internal combustion marine engine associated with a watercraft, the method comprising injecting fuel into the internal combustion engine where the fuel mixes with air, igniting the air/fuel mixture, sensing a speed of the engine, sensing a water pressure, sensing a second pressure, comparing the sensed water pressure with the sensed second pressure, comparing the sensed water pressure and the sensed second pressure, and disabling combustion based on the comparison.

8. The method of claim 7, wherein combustion is restored when the comparison of the sensed water pressure and the sensed second pressure is below the predetermined comparison value.

9. The method of claim 7, wherein disabling combustion comprises intermittently stopping fuel injection to at least one cylinder of the engine.

10. The method of claim 7, wherein disabling combustion comprises intermittently stopping ignition to at least one cylinder of the engine.

11. A method of controlling an internal combustion marine engine associated with a watercraft, the method comprising injecting fuel into the internal combustion engine where the fuel mixes with air, igniting the air/fuel mixture, sensing a watercraft speed through a watercraft speed sensor, comparing the sensed watercraft speed and a predetermined watercraft speed, disabling combustion and therefore limiting engine speed if the sensed watercraft speed is less than the predetermined watercraft speed.

12. The method of claim 11, wherein combustion in the engine is restored if the sensed watercraft speed is above the predetermined watercraft speed.

13. The method of claim 11, wherein disabling combustion comprises intermittently stopping fuel injection to at least one cylinder of the engine.

14. The method of claim 11, wherein disabling combustion comprises intermittently stopping ignition to at least one cylinder of the engine.

15. The method as defined in claim 11, wherein a watercraft speed is sensed to determine whether water is flowing through the propulsion unit and engine speed is limited based on the sensed watercraft speed.

* * * * *

UNITED STATES PATENT AND TRADEMARK OFFICE

CERTIFICATE OF CORRECTION

PATENT NO. : 6,899,578 B2
APPLICATION NO. : 10/441920
DATED : May 31, 2005
INVENTOR(S) : Nagafusa It is certified that error appears in the above-identified patent and that said Letters Patent is hereby corrected as shown below:

After section (65), please insert the following:

--(30) Foreign Application Priority Data

June 6, 2000 (JP) .....2000-169273--

Signed and Sealed this

Thirtieth Day of January, 2007

JON W. DUDAS
*Director of the United States Patent and Trademark Office*